(12) United States Patent
Liu

(10) Patent No.: US 7,647,406 B2
(45) Date of Patent: Jan. 12, 2010

(54) METHOD FOR IMPLEMENTING RESOURCES RESERVATION IN A PROXY-REQUESTED MODE IN NEXT GENERATION NETWORK

(75) Inventor: Enhui Liu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 358 days.

(21) Appl. No.: 11/573,428

(22) PCT Filed: Feb. 27, 2006

(86) PCT No.: PCT/CN2006/000280

§ 371 (c)(1),
(2), (4) Date: Mar. 15, 2007

(87) PCT Pub. No.: WO2006/094446

PCT Pub. Date: Sep. 14, 2006

(65) Prior Publication Data

US 2008/0256237 A1   Oct. 16, 2008

(30) Foreign Application Priority Data

Mar. 8, 2005   (CN) .................. 2005 1 0053508

(51) Int. Cl.
*G06F 15/173* (2006.01)
(52) U.S. Cl. .................. 709/226; 709/224; 709/225
(58) Field of Classification Search .................. 709/223, 709/224, 225, 226, 229, 217, 238; 370/252
See application file for complete search history.

(56) References Cited

U.S. PATENT DOCUMENTS 7,289,453 B2 *   10/2007   Riedel et al. ................. 370/252
7,478,161 B2 *    1/2009   Bernet et al. ................. 709/228

(Continued)

FOREIGN PATENT DOCUMENTS

CN          1545290 A          11/2004

(Continued)

OTHER PUBLICATIONS

Durham et al., *IETF Standard* (Jan. 2000).

(Continued)

*Primary Examiner*—Le Luu
(74) *Attorney, Agent, or Firm*—Leydig, Voit & Mayer, Ltd.

(57) ABSTRACT

A method for implementing resources reservation in a proxy-requested mode in an NGN, includes: an AF entity sending a resources request message carrying resources requirement parameters information on behalf of a user to a resources mediation PDF; the resources mediation PDF making an admission decision according to network operation policy rules, subscriber configuration files, and availability of transport resources; if the corresponding resources request is admitted, the resources mediation PDF sending an admission installation command to a BGF, setting and keeping corresponding admission decision parameters information in the BGF; the BGF forwarding subscriber traffic entering networks according to the admission decision parameters information to ensure QoS class requested by the user. According to the present invention, terminals with various QoS negotiation capabilities are supported, and QoS requirement parameters of the media flows are negotiated or are determined by the AF entity according to the media flows and service operation policies.

17 Claims, 5 Drawing Sheets

U.S. PATENT DOCUMENTS

| | | | |
|---|---|---|---|
| 2002/0091810 A1* | 7/2002 | Hundscheidt et al. | 709/223 |
| 2002/0194369 A1* | 12/2002 | Rawlins et al. | 709/238 |
| 2003/0046396 A1* | 3/2003 | Richter et al. | 709/226 |
| 2003/0074443 A1* | 4/2003 | Melaku et al. | 709/224 |
| 2003/0093496 A1* | 5/2003 | O'Connor et al. | 709/217 |
| 2004/0205206 A1 | 10/2004 | Naik et al. | |
| 2007/0237078 A1 | 10/2007 | Hundscheidt et al. | |

FOREIGN PATENT DOCUMENTS

| | | | |
|---|---|---|---|
| KR | 2002-0026984 A | 4/2002 | |
| WO | WO 02/052869 A2 | 7/2002 | |
| WO | WO 2004/102896 A2 | 11/2004 | |

OTHER PUBLICATIONS

*European Telecommunications Standards Institute*, V 1.1.0 (Dec. 2004).

Huawei Technologies Co. et al., *ETSI TISPAN*, 4td170r1: 1-5 (Sep. 13, 2004).

*International Telecommunication Union*, 1-22 (Dec. 3, 2004).

Prior et al., *Proceedings of the 38th Hawaii International Conference on Systems Sciences*, 305c-305c (Jan. 3, 2005).

* cited by examiner

METHOD FOR IMPLEMENTING RESOURCES RESERVATION IN A PROXY-REQUESTED MODE IN NEXT GENERATION NETWORK

This application is the U.S. National Phase of International Patent Application No. PCT/CN2006/000280, filed on Feb. 27, 2006, which claims priority to Chinese Patent Application No. 200510053508.9, filed on Mar. 8, 2005, all of which are hereby incorporated by reference.

FIELD OF THE INVENTION

The present invention relates to network communications, and more particularly, to a method for implementing resources reservation in a proxy-requested mode in a next generation network.

BACKGROUND OF THE INVENTION

In a next generation network (NGN), packet techniques such as IP are adopted as a bearer network technique to integrate fixed communications and mobile communications. The NGN network is an integrated network that makes use of IP connectivity among telecommunication entities to carry various types of telecommunication services such as voice, image, and data and so on. Although the deployment of NGN has already begun, many problems, such as quality of service (QoS), security, reliability, operablility and manageablity of the IP bearer network still need a perfect solution.

Two international standard organizations, ITU-T and ETSI, have respectively set up a special research group dedicated to draft the standards for NGN technique, which are in an architecture stage at present. It has become an agreement of a majority of main operators and venders to use a resource and admission control subsystem (RACS) to solve the problems of QoS, network address translation (NAT), and firewall traversal within the NGN bearer network.

The scopes of the RACS drafts of the two organizations are different. In other words the ETSI TISPAN considers only the packet transport pails of access networks, while the ITU-T FGNGN considers the packet transport parts of core networks besides the packet transport parts of access networks. However the architectures of the two RACS drafts are similar and compatible. Both of them make reference to an idea of admission control based on operation policy rules at edges of the network, which is used by 3GPP PDF (3rd generation partner project policy decision function) and PacketCable GC (Gate Controller). The result of checking transport resource availability within networks is added to each RACS drafts to serve as one of the conditions of admission control, so that unacceptable congestion, delay or packet loss for the application layer, which may result from that service traffic and their QoS class requirements exceed the network bearer capabilities, are avoided. At the same time, NAT, firewall traversal and support of various NGN multimedia services are taken into consideration in each RACS drafts.

The architecture definition in the current RACS drafts has been substantially stable and the RACS functional architecture needs to support various types of resources reservation mechanisms. At present, there are the following three resources reservation modes.

(1) Proxy-Requested Mode

Service control equipment initiates a resources request to the resource and admission control layer on behalf of the user. The service control equipment can extract the explicit bandwidth and QoS requirements of the media flows of the session which are contained in the user service request signal, or determine the bandwidth and QoS requirements of the media flows of the session according to the operation policy rules (for example, service type or encoding/decoding type, etc.) of the service layer.

(2) CPE-Requested Mode

Customer premises equipment (CPE) initiates a resources request to the network through a dedicated path coupling signal. The resources request can be initiated for each session or be initiated concerning no session. The resources request can either be authorized in advance by the service control device or not.

(3) Access Configuration Mode

When a subscriber accesses the network, network access management equipment initiates a resources request to the network according to subscriber service level agreement (SLA) information in the subscriber configuration file. The resource request is in per subscriber-level and has no association with the sessions.

The structure of the functional architecture of RACS is provided in the latest RACS draft which is released by the ITU-T FGNGN in December, 2004. The structure is shown in FIG. 1.

An application function entity(AF) refers to a service layer function entity which requests for resource and admission control and requests the resources reservation and release for application media flows; the AF includes such function entities as a session control proxy function (SCPF), an interconnection border control function (IBCF) and the like.

An network access attachment function (NAAF) refers to functions which are in charge of network access management control; the NAAF includes network access authentication, authorization and dynamic IP address allocation of subscriber equipment, configuration for access equipment, storage of subscriber configuration files and the like.

A Resources mediation entity (RM) receives the resources reservation request, checks whether the resources reservation requests are consistent with the operation policy rules, interacts with related functions to check whether the resources reservation requests are consistent with the subscriber configuration information stored in a subscriber configuration database and whether there are idle and available transport resources within networks meeting the resources reservation requirements, and makes an admission decision according to the above checking results. The resources mediation entity includes a mediation policy decision function entity (M-PDF) located in the service access side and an interconnection policy decision function entity (I-PDF) located in the service interconnection side.

A transport resources control function entity (TRCF) receives a resources request from the resources mediation functions, checks whether there are idle and available transport resources within networks for the resources request according to the collected and maintained network topology and resources status database, and controls the QoS related forwarding actions of transport equipment in networks. If there are multiple transport resources control function entities in one network, these entities communicate with each other to check the availability of transport resources from the ingress edge to the egress edge within the whole network. A transport resources control function entity includes a transport resources control function entity located in the access network (A-TRCF) and a transport resources control function entity located in the core network (C-TRCF).

A border gateway function entity (BGF) of the core network receives, stores and executes information of admission decision parameters received from the resource and admission control layer, performs packet filtering, traffic classification, marking, policing and shaping, and may further perform network address translation and security inspect filtering on packets.

The functional architecture of RACS is also provided in the latest RACS draft which is released by the ETSI TISPAN in January, 2005, as shown in FIG. 2.

An application function (AF) refers to a service layer function entity which requests for the resource and admission control and requests the resources reservation and releasing for an application media flow.

A network additional subsystem function (NASS) refers to functions which are in charge of network access management control; the NASS includes network access authentication, authorization and dynamic IP address allocation for subscriber equipment, configuration for access equipment, storage of subscriber configuration files and the like.

A service-based policy decision function (SPDF) receives a resources reservation request, checks whether the resources reservation request are consistent with the operation policy rules, interacts with an access network resources admission and control function (A-RACF) to check whether there are idle and available transport resources in access networks meeting the requirements, and then makes an admission decision according to the above checking results.

An access network resource and admission and control function entity (A-RACF) receives a resources request from the SPDF, checks whether there are idle and available transport resources in the access network meeting the requirements, and controls the QoS-related forwarding actions of transport equipment in networks for assuring the QoS.

A border gateway function entity of the core network (C-BGF) receives, stores and executes information of admission decision parameters received from the resource and admission control layer, performs packet filtering, traffic classification, marking, policing and shaping, and may perform network address translation and security inspect filtering on packets.

SUMMARY OF THE INVENTION

Embodiments of the present invention provides a method for implementing resources reservation in a proxy-requested mode in a next generation network (NGN) so as to enable the existing RACS functional architecture to implement processing for resources reservation in the proxy-requested mode.

According to embodiments of the present invention, a method for implementing resources reservation in a proxy-requested mode in a next generation network (NGN), includes:

an application function entity (AF) sending a resources request message to a resources mediation policy decision function entity (PDF), wherein the message carries resources requirement parameters information needed by a user traffic;

after receiving the resources request message, the resources mediation PDF checking whether the corresponding resources request is consistent with a related subscriber configuration file and related network operation policy rules, checking whether there are idle and available resources meeting requirements in related transport networks, and making an admission decision for the corresponding resources request according to a checking result;

if the corresponding resources request is admitted, the resources mediation PDF sending an admission installation command to a border gateway function entity (BGF), setting and keeping corresponding admission decision parameters information in the BGF; and the BGF performing forwarding operations of the user traffic entering the network according to the admission decision parameters information.

It can be seen that the embodiments of the present invention support terminals with various QoS negotiation capabilities without changing the process of service negotiation.

Moreover, during a process of service negotiation, QoS requirement parameters of media flows can be negotiated or be determined by service control equipment, i.e. an AF, according to the type of the media flow and the service operation policy rules.

A resources request is initiated to the NGN resource and admission control subsystem by the AF in a proxy mode instead of by the subscriber directly, thereby an additional process of authorizing the validity of resources request is avoided, the process of resources authorization is simplified, and in turn the cooperation and synchronization between the service layer and transport layer are implemented.

DETAILED DESCRIPTION OF THE INVENTION

Figure 1:
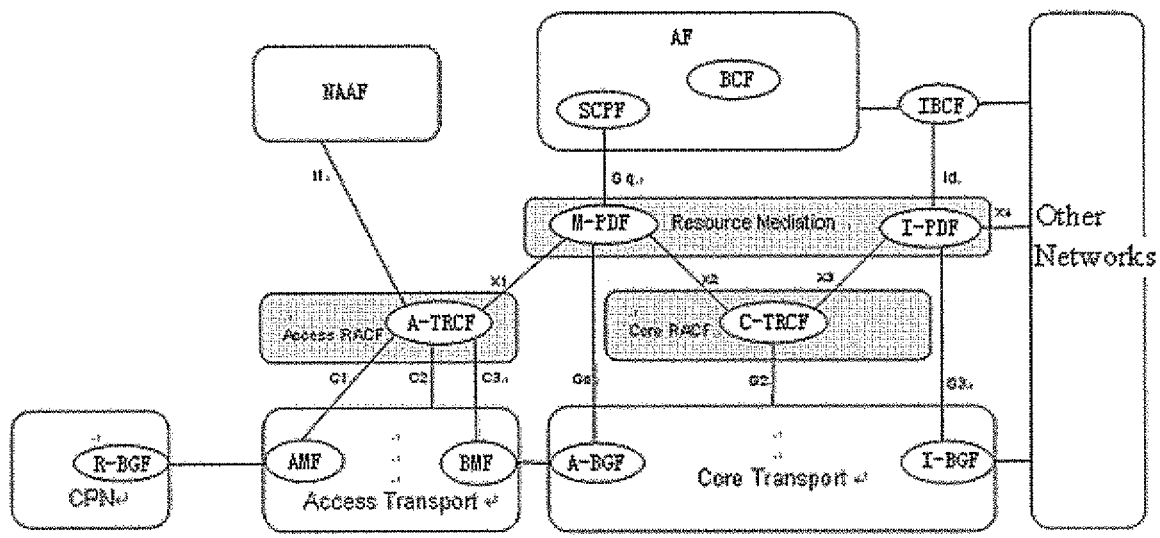
FIG. 1 is a schematic diagram illustrating the system architecture of RACS provided by the ITU-T FGNGN.
Figure 2:
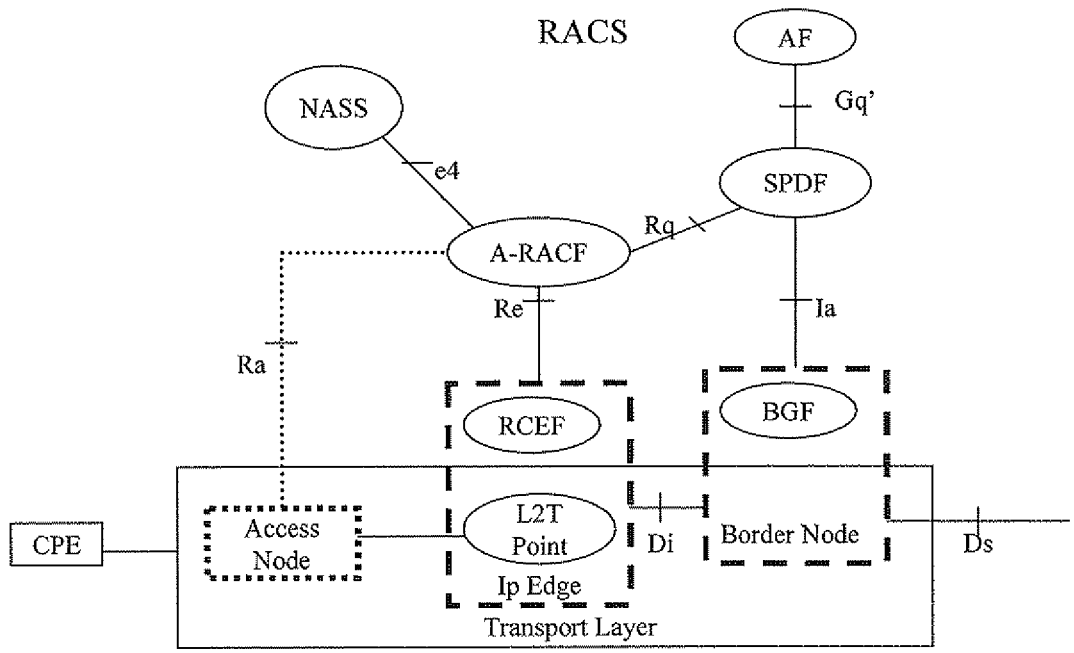
FIG. 2 is a schematic diagram illustrating the system architecture of RACS provided by the ETSI TISPAN.

In order to make the technical solutions and advantages of the present invention clearer, embodiments of the present invention is described in detail in conjunction with the accompanying drawings hereinafter.

The embodiments of the present invention provides methods for processing resources reservation in a proxy-requested mode in an NGN resource and admission control subsystem.

The method for implementing resources reservation in the proxy-requested mode can support terminals with various QoS negotiation capabilities without changing the process of service negotiating. During a process of service negotiation, QoS requirement parameters of media flows can be negotiated or be determined by service control equipment according to the type of the media flow and the service operation policy rules. A resources request is initiated to the NGN resource and admission control subsystem by the AF in a proxy mode on behalf of the user, thereby an additional process of authorizing the validity of resources request is avoided, the process of resources authorization is simplified, and in turn the cooperation and synchronization between the service layer and transport layer are implemented.

Since the RACS functional architecture of the ETSI TISPAN corresponds to the access part of the RACS architecture of the ITU-T FGNGN and therefore is a subsystem compatible therewith, the embodiments of the present invention are described based on the RACS architecture of the ITU-T FGNGN. However, those skilled in the art may appreciate that the method and process provided by the embodiments of the present invention are applicable to the RACS architecture of the ETSI TISPAN as well. In the RACS architecture of ETSI TISPAN, an AF initiates a resources request; an SPDF makes the admission control; and a BGF stores corresponding information of admission decision parameters; in the RACS functional architecture, the TRCF corresponds to the A-RACF in the system.

According to embodiments of the present invention, the service control equipment initiates the resources request to the resource and admission control subsystem on behalf of the user. The service control equipment includes a call proxy in softswitch systems, a P-CSCF (proxy call session control function) in IMS (IP multimedia service subsystems), and the like. In accordance with the embodiments of the present invention, the service control equipment with a function of resources requesting is called an AF (application function). Events triggering the AF to initiate a resources request include actions during session establishment procedure, actions during media re-negotiation procedure, or internal actions. The AF extracts negotiated bandwidth and QoS requirement of the media flows of the session from user service request signal, or determines the bandwidth and QoS requirement of the media flows of the session according to the service operation policy rules. The service operation policy rules can be associated with service types, media flow characteristics, or the like.

Figure 3:
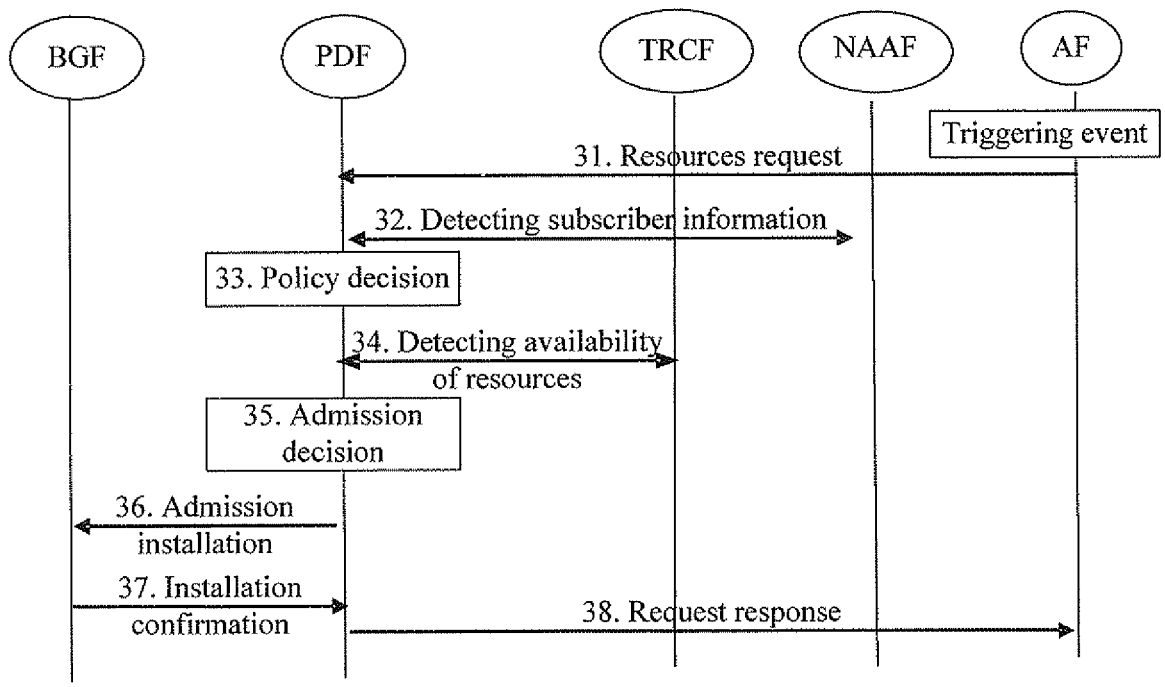
FIG. 3 is a schematic diagram illustrating the process of an AF initiating a resources reservation request according to an embodiment of the present invention.

According to the embodiments of the present invention, the detailed manner of implementing resources reservation in the proxy-requested mode in the NGN is shown in FIG. 3, that is, the process of handling the resources request initiated to the resource and admission control subsystem by the AF is shown in FIG. 3, which in detail includes the following steps.

Step 31: the AF sends a resources request message to a resources mediation PDF. The resources request message carries information of resources to be reserved.

The information of resources to be reserved includes identifiers of the media flows, for example IP quintuple information, bandwidth requirement parameters, QoS requirement parameters, and so on. According to such information, the corresponding admission decision parameters information may be determined.

Step 32: the resources mediation PDF interacts with the NAAF holding the subscriber information to check whether the resources request is consistent with the subscriber information including subscriber configuration information and authorization information associated with the QoS.

Step 33: after checking the subscriber information, the resources mediation PDF makes a policy decision according to the network operation policy rules.

The resources mediation PDF can use the network operation policy rules stored locally or in a remote policy storage server to make the corresponding policy-based decision, so as to check whether the resources request is consistent with the requirements of corresponding network operation policy rules. If the resources request is consistent with the requirements, proceed to check the availability of transport resources; otherwise, refuse the resources request directly.

Step 34: the resources mediation PDF interacts with the TRCF to check the availability of transport resources.

The resources mediation PDF interacts with the TRCT in charge of controlling network performance to check the availability of transport resources, positions and determines the TRCF within the involved access networks and core networks along the path of the media flows according to the resources request, and then forward the resources request to the corresponding TRCF to check if the required QoS are available within the involved networks. The TRCF returns the checking result of the availability of transport resources to the resources mediation PDF.

In order to control and ensure the network performance, the TRCF may also perform status collection and parameter configuration for the routing and forwarding actions of the network transport equipment.

Step 35: the PDF makes the final admission control decision for the resources request.

That is, after receiving the resources request from the AF, the resources mediation PDF makes the final admission control decision according to the network operation policy rules, the subscriber configuration file and/or the availability of transport resources. After the final admission control decision is made, proceed to Step 36.

Practically, if the result of the admission control decision is "unadmitted", the resources mediation PDF returns a resources request response message including a rejection reason directly to the AF.

Step 36: the resources mediation PDF sends an admission installation command to install the final admission control decision in the BGF; after receiving the admission installation command, the BGF installs the final admission control decision and processes data traffic according to the installed admission control decision.

The final admission control decision is a set of admission decision parameters including identifiers of media flows (such as IP quintuple), bandwidth requirement information, priority information, and the like.

The BGF saves the installed final admission decision parameters.

Step 37: the BGF returns an admission installation confirmation message to the resources mediation PDF.

Step 38: after receiving the admission installation confirmation message, the resources mediation PDF needs to return a resources request response message to the AF to notify the AF of the result of resources request processing.

Figure 4:
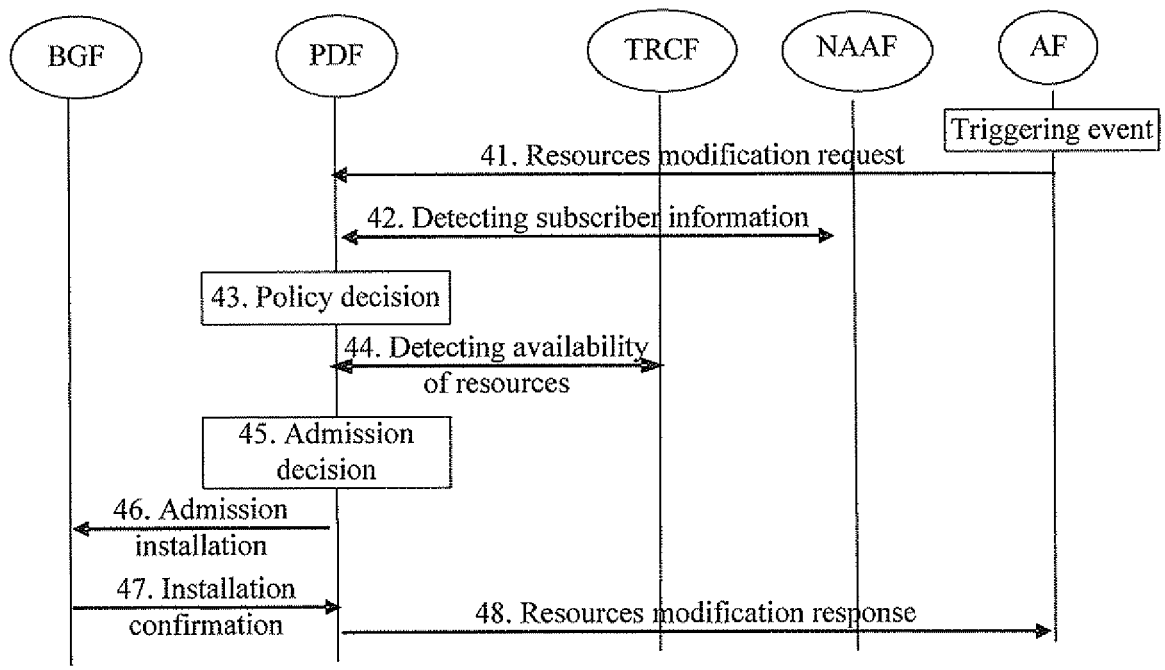
FIG. 4 is a schematic diagram illustrating the process of an AF initiating a resources reservation modification request according to an embodiment of the present invention.

According to the embodiments of the present invention, the AF can initiate a modification for resources reservation including modification of address, bandwidth, QoS class, and so on. Events triggering the AF to initiate the modification for resources reservation include actions happening during the procedure of media flow re-negotiating, internal actions, or the like. The process of the NGN resource and admission control subsystem handling the resources modification request initiated by the AF is shown in FIG. 4, which in detail includes the following steps.

Step 41: the AF sends a resources modification request message to the resources mediation PDF. The resources modification request message carries modified information of resources to be reserved.

The modified information of resources to be reserved includes identifiers of the media flows (for example IP quintuple information), bandwidth requirement parameters, QoS requirement parameters, and so on. According to such information, the corresponding admission decision parameters information can be determined and modified.

Step 42: the resources mediation PDF interacts with the NAAF holding the subscriber information to check whether the resources modification request is consistent with the subscriber information including subscriber configuration information and authorization information associated with the QoS.

Step 43: after checking the subscriber information, the resources mediation PDF makes a policy decision according to the network operation policy rules; and if the resources modification request is consistent with the network operation policy rules, proceed to Step 44.

Step 44: the resources mediation PDF interacts with the TRCF to check the availability of transport resources.

If there are available resources within the involved networks for the resources modification request, proceed to Step 45.

Step 45: the PDF makes the final admission control decision for the resources modification request.

That is, after receiving the resources modification request from the AF, the resources mediation PDF makes the final admission control decision according to the network operation policy rules, the subscriber configuration file and/or the availability of transport resources. After the final admission decision is made, proceed to Step 46.

Practically, if the result of the admission control decision is "unadmitted", the resources mediation PDF returns a resources modification request response message including a rejection reason directly to the AF.

Step 46: the resources mediation PDF sends an admission installation command to install the final admission control decision in the BGF; after receiving the admission installation command sent by the resources mediation PDF, the BGF installs locally the final admission control decision and processes data traffic according to the installed final admission control decision.

The final admission control decision is a set of admission decision parameters including identifiers of media flows (such as IP quintuple), bandwidth requirement information, QoS parameters, and the like.

The BGF modifies the previously installed parameters and keeps the newly installed final admission control decision parameters.

Step 47: the BGF returns an admission installation confirmation message to the resources mediation PDF.

Step 48: after receiving the admission installation confirmation message, the resources mediation PDF needs to return a resources modification request response message to the AF to notify the AF of the result of processing the resources modification request.

Figure 5:
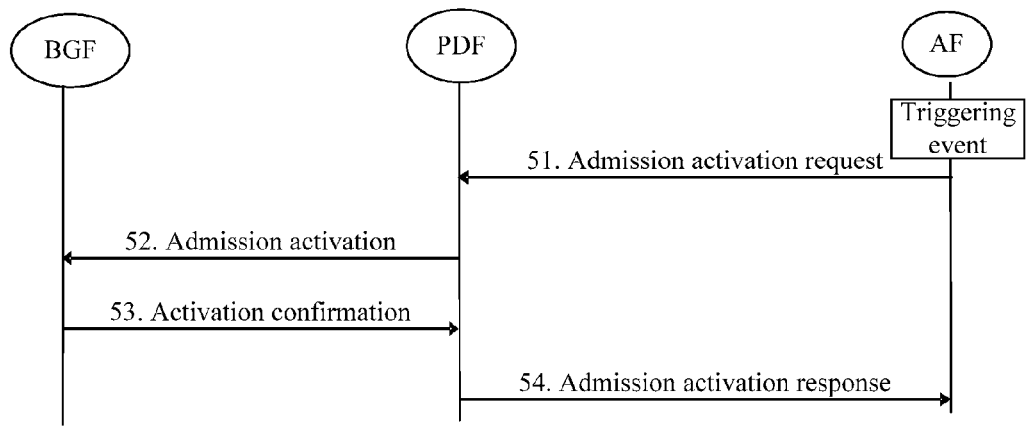
FIG. 5 is a schematic diagram illustrating the process of an AF initiating an admission activation request according to an embodiment of the present invention.

During a multimedia session, when re-negotiating media flows, and when processing such services as call waiting service, the NGN resource and admission control subsystem allows the AF to directly initiate an admission activation request, and lets the BGF (border gateway function) start enforcing the previously installed admission control decision for the authorized resources requested by the resources mediation PDF. The process of the NGN resource and admission control subsystem initiating an admission activation request to the AF is shown in FIG. 5.

Step 51: after determining that an event which requires the activation of corresponding admission decision parameters has happened, the AF sends an admission activation request message to the resources mediation PDF.

The admission activation request message carries information of admission decision parameters to be activated or identification information thereof.

Step 52: after receiving the admission activation request message, the resources mediation PDF sends an admission activation command to the BGF.

The admission activation command carries information of admission decision parameters to be activated or identification information thereof, so as to facilitate the BGF in determining the admission decision parameters to be activated.

Step 53: after receiving the admission activation command and performing corresponding activation operations, the BGF returns an activation confirmation message to the resources mediation PDF.

After the activation of corresponding information of admission decision parameters is confirmed, the corresponding information of admission decision parameters can be used as the basis of controlling the corresponding service flow.

Step 54: after receiving the activation confirmation message, the resources mediation PDF returns an activation response message to notify the AF of the result of the activation process of the corresponding admission decision parameters.

Figure 6:
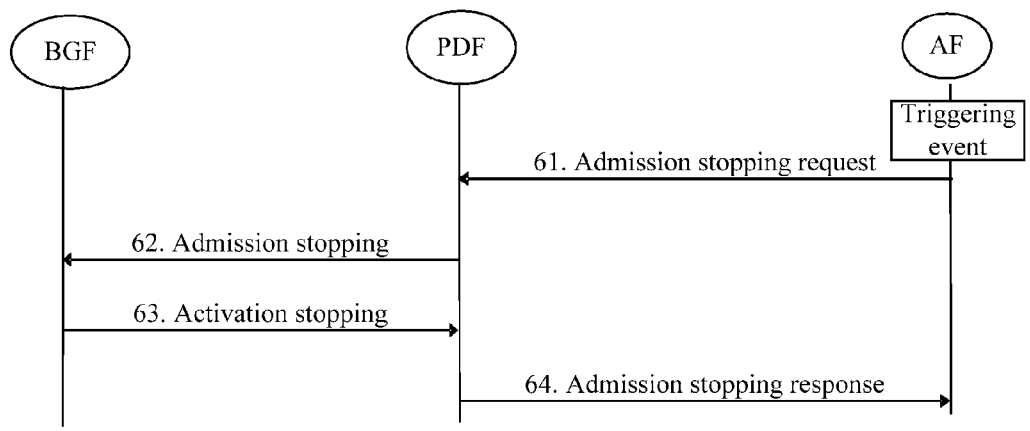
FIG. 6 is a schematic diagram illustrating the process of an AF initiating an admission de-activation request according to an embodiment of the present invention.

According to the embodiments of the present invention, during a multimedia session, when re-negotiating media flows, and when processing such services as call waiting service, the NGN resource and admission control subsystem allows the AF to directly initiate an admission de-activation request, and lets the BGF stop enforcing the previously installed admission control decision result for the authorized resources requested by the resources mediation PDF. The process of the NGN admission control subsystem initiating an admission de-activation request to the AF is shown in FIG. 6 and in detail includes the following steps.

Step 61: after determining that the event whichs requires the de-activation of corresponding admission decision parameters has happened, the AF sends an admission de-activation request message to the resources mediation PDF.

The admission de-activation request message carries information of admission decision parameters to be stopped enforcing or the identification information thereof.

Step 62: after receiving the admission de-activation request message, the resources mediation PDF returns an admission de-activation command to the BGF.

The admission de-activation command carries information of admission decision parameters to be stopped enforcing or the identification information thereof, so as to facilitate the BGF in determining the admission decision parameters to be stopped.

Step 63: after receiving the admission de-activation command and performing the corresponding de-activation process, the BGF returns a de-activation confirmation message to the resources mediation PDF.

After the de-activation of the information of corresponding admission decision parameters is confirmed, the information of corresponding admission decision parameters can not be used as the basis of controlling the corresponding service flow any more.

Step 64: after receiving the de-activation confirmation message, the resources mediation PDF returns a de-activation response message to notify the AF of the result of the de-activation process of the corresponding resources admission decision parameters.

Figure 7:
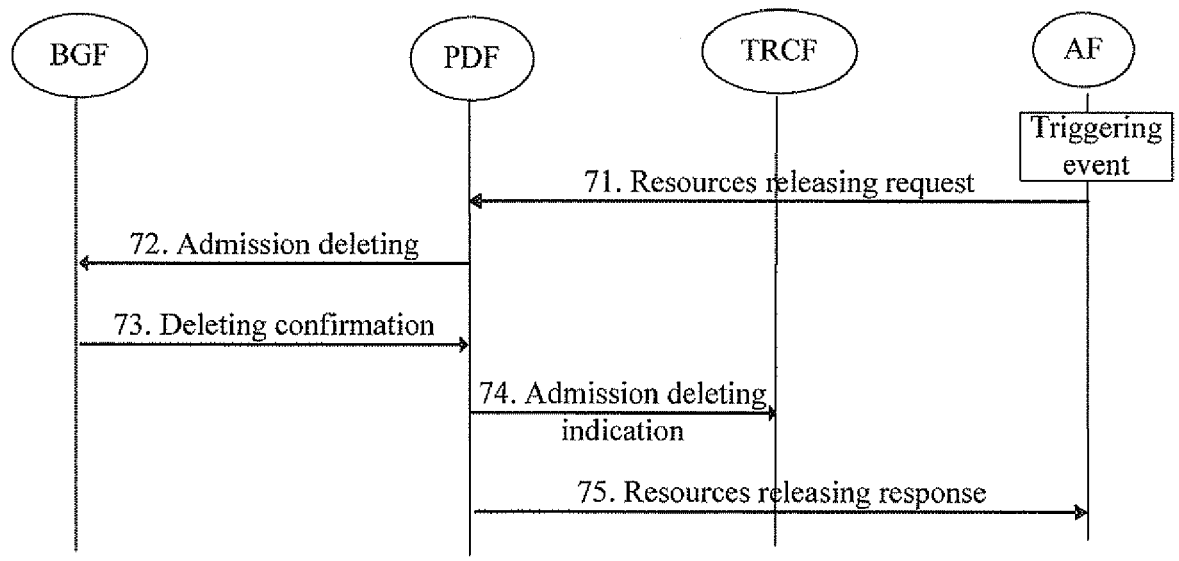
FIG. 7 is a schematic diagram illustrating the process of an AF initiating a resources releasing request according to an embodiment of the present invention.

At the end of a session, an AF should initiate a release of the resources reservation. The AF can initiate a resources releasing request during the session in order to support the process of media re-negotiating during the multimedia session. The method of the NGN resource and admission control system initiating a resources releasing request to the AF is shown in FIG. 7, which in detail includes the following steps.

Step 71: after releasing the corresponding session, the AF needs to send a resources releasing request message to the resources mediation PDF.

The resources releasing request message carries the information of admission decision parameters to be released or the identification information thereof so as to facilitate determining the admission decision to be released.

Step 72: after receiving the resources releasing request message, the resources mediation PDF returns an admission deleting or stopping command to the BGF.

The command carries information of admission decision parameters to be deleted or stopped or the identification information thereof Step 73: after performing the deleting or stopping operations on the corresponding admission decision parameters information the BGF sends a deleting or stopping confirmation message to the resources mediation PDF.

Step 74: after receiving the confirmation message, the resources mediation PDF needs to send an admission deleting indication message to the TRCF to facilitate the TRCF in releasing the resources previously allocated for the corresponding subscriber.

Step 75: and then, the resources mediation PDF further needs to send a resources releasing response message to the AF.

Figure 8:
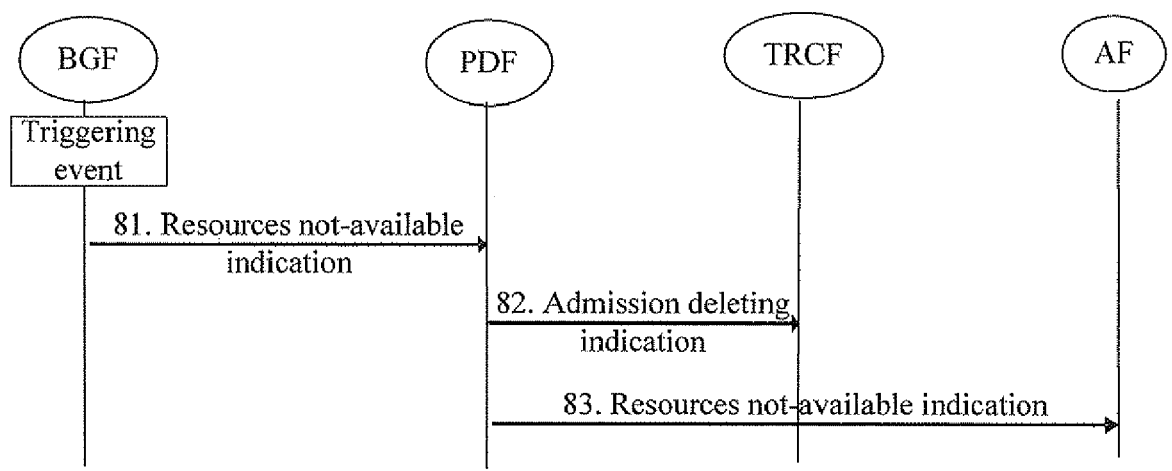
FIG. 8 is a schematic diagram illustrating the process of a BGF reporting a resources unavailable indication according to an embodiment of the present invention.

According to the embodiments of the present invention, during the session, if there are not available bandwidth resources for the authorized resources reservation due to the interface failure of the BGF, the BGF should initiatively send a resources unavailable indication to the resources mediation PDF. If the resources reservation is associated with the session, the PDF may be triggered to send the resources unavailable indication to the AF again. The corresponding process is shown in FIG. 8 and includes in detail the following steps.

Step 81: after determining that the resources are not available, the BGF deletes or stops corresponding information of admission decision parameters and sends a resources unavailable indication to the resources mediation PDF.

Step 82: after receiving the resources unavailable indication, the resources mediation PDF sends an admission deleting indication to the TRCF to facilitate the TRCF in modifying the resources previously allocated for the corresponding subscriber.

Step 83: after receiving the resources unavailable indication, the resources mediation PDF also needs to send the resources unavailable indication to the AF to facilitate the AF in releasing the corresponding session.

Figure 9:
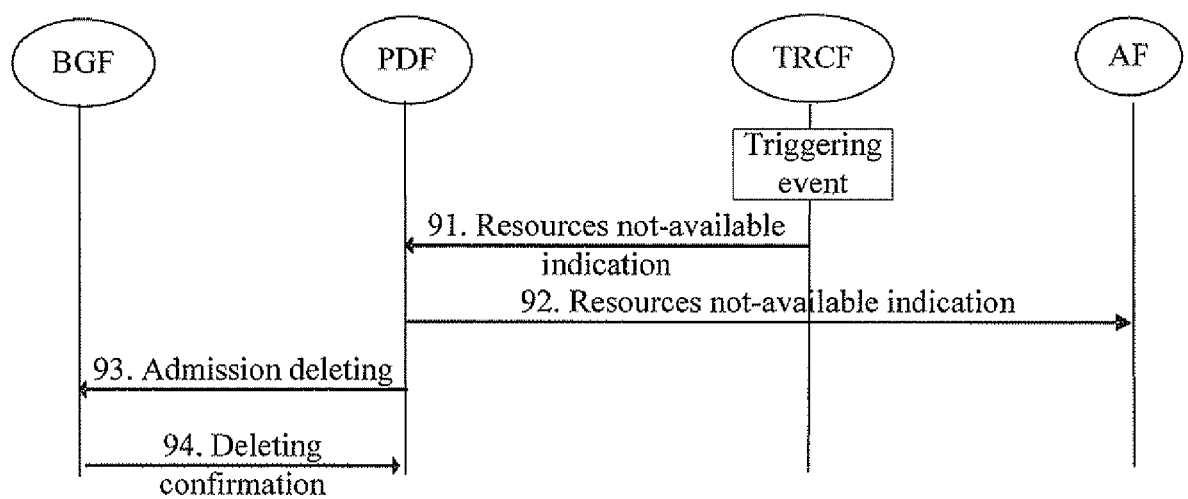
FIG. 9 is a schematic diagram illustrating the process of a TRCF reporting a resources unavailable indication according to an embodiment of the present invention.

According to the embodiments of the present invention, during a session, when the TRCF determines that there are not available bandwidth resources for the related authorized resources reservation due to the failure within the network and the like, the TRCF should initiatively send a resources unavailable indication to the resources mediation PDF. If the resources reservation is associated with the session, the PDF may be triggered to send the resources unavailable indication to the AF again. The corresponding process is shown in FIG. 9 and includes in detail the following steps.

Step 91: when determining the resources are not available, the TRCF sends a resources unavailable indication to the resources mediation PDF.

Step 92: after receiving the resources unavailable indication, the resources mediation PDF sends the resources unavailable indication to the AF.

Step 93: after receiving the resources unavailable indication, the resources mediation PDF further returns an admission deleting or stopping command to the BGF.

Step 94: after performing the deleting or stopping operations on the corresponding admission decision parameters information, the BGF sends a deleting or stopping confirmation message to the resources mediation PDF.

To sum up, the embodiments of the present invention provide a solution for implementing resources reservation in the proxy-requested mode, and are able to support terminals with various QoS negotiation capabilities without changing the process of service negotiation. Moreover, a resources request is initiated to the NGN resource and admission control subsystem by the service control equipment in the proxy mode instead of by the subscriber directly, thus the additional process of authorizing the validity of resources request is avoided, the process of resources authorization is simplified, and the cooperation and synchronization between the service layer and transport layer are implemented.

The foregoing is only preferred embodiments of the present invention. The protection scope of this invention, however, is not limited to the above description. Any change or substitution, within the technical scope disclosed by this invention and easily occurring to those skilled in the art, should be covered by the protection scope of this invention. Therefore, the protection scope of the present invention should be according to claims.

The invention claimed is:

1. A method for implementing resources reservation in a proxy-requested mode in a next generation network (NGN), comprising:

an application function entity (AF) located in service control equipment sending a resources request message to a resources mediation policy decision function entity (PDF) located in network service access side of the NGN, wherein the message carries resources requirement parameters information needed by a user traffic;

after receiving the resources request message, the resources mediation PDF checking whether the corresponding resources request is consistent with a related subscriber configuration file and related network operation policy rules, checking whether there are idle and available resources meeting requirements in related transport networks, and making an admission decision for the corresponding resources request according to a checking result;

if the corresponding resources request is admitted, the resources mediation PDF sending an admission installation command to a border gateway function entity (BGF), setting and keeping corresponding admission decision parameters information in the BGF; and the BGF performing forwarding operations of the user traffic entering the network according to the admission decision parameters information.

2. The method according to claim 1, further comprising:

the AF sending a resources modification request message to the resources mediation PDF, wherein the message carries modified information of the resources to be reserved;

after receiving the resources modification request message, the resources mediation PDF checking whether the resources modification request is consistent with the subscriber configuration file and the network operation policy rules, checking whether there are idle and available resources meeting the requirements in the related transport networks, and making an admission decision for the resources modification request according to the checking result;

if the resources modification request is admitted, the resources mediation PDF sending an admission modification command to the BGF and modifying the corresponding admission decision parameters information in the BGF; and the BGF performing forwarding operations on the user traffic entering the network according to the modified admission decision parameters information.

3. The method according to claim 2, further comprising:
the resources mediation PDF receiving the resources request message or the resources modification request message; and
the resources mediation PDF interacting with a network access attachment function (NAAF) to check the subscriber information.

4. The method according to claim 2, further comprising:
after receiving the resources request message or the resources modification request message, the resources mediation PDF obtaining network operation policy rules locally or from a remote entity, and making a policy decision according to the corresponding network operation policy rules.

5. The method according to claim 2, further comprising:
after receiving the resources request message or resources modification request message, the resources mediation PDF interacting with a transport resources control function (TRCF) to check availability of transport resources.

6. The method according to claim 2, further comprising:
the BGF determining the admission decision parameters information and modifying the admission decision parameters information or activating/de-activating/deleting the corresponding admission decision parameters information; and
the BGF sending a confirmation message to the resources mediation PDF; and
the resources mediation PDF sending a corresponding response message to the AF.

7. The method according to claim 1, further comprising:
the resources mediation PDF receiving the resources request message or the resources modification request message; and
the resources mediation PDF interacting with a network access attachment function (NAAF) to check the subscriber information.

8. The method according to claim 1, further comprising:
after receiving the resources request message or the resources modification request message, the resources mediation PDF obtaining network operation policy rules locally or from a remote entity, and making a policy decision according to the corresponding network operation policy rules.

9. The method according to claim 1, further comprising:
after receiving the resources request message or resources modification request message, the resources mediation PDF interacting with a transport resources control function (TRCF) to check availability of transport resources.

10. The method according to claim 1 further comprising:
the AF sending an admission activation or de-activation request message to the resources mediation PDF; wherein the message carries the resources requirement parameters information to be activated or de-activated or identification information thereof;
after receiving the admission activation or de-activation request message, the resources mediation PDF sending an admission activation or de-activation command to the BGF, wherein the command carries the admission decision parameters information to be activated or de-activated or identification information thereof;

after receiving the command, the BGF performing activation or de-activation operations on the corresponding admission decision parameters information.

11. The method according to claim 10, further comprising:
the BGF determining the admission decision parameters information and modifying the admission decision parameters information or activating/de-activating/deleting the corresponding admission decision parameters information; and
the BGF sending a confirmation message to the resources mediation PDF; and
the resources mediation PDF sending a corresponding response message to the AF.

12. The method according to claim 1, further comprising:
the BGF determining the admission decision parameters information and modifying the admission decision parameters information or activating/de-activating/deleting the corresponding admission decision parameters information; and
the BGF sending a confirmation message to the resources mediation PDF; and
the resources mediation PDF sending a corresponding response message to the AF.

13. The method according to claim 1, further comprising:
the AF sending a resources releasing request message to the resources mediation PDF, wherein the message carries the admission decision parameters information to be released or identification information thereof;
the resources mediation PDF sending an admission deleting or stopping command to the BGF, wherein the message carries the admission decision parameters information to be released or the identification information;
the BGF deleting or stopping enforcing the corresponding admission decision parameters information.

14. The method according to claim 13, wherein the step of the BGF deleting or stopping enforcing the corresponding admission decision parameters information further comprises:
after deleting or stopping the corresponding admission decision parameters information, the BGF sending a confirmation message to the resources mediation PDF;
after receiving the confirmation message, the resources mediation PDF sending a resources releasing indication message to the TRCF, wherein the message carries the admission decision parameters information to be released or identification information thereof;
after receiving the resources releasing message, the TRCF modifying resources allocation information stored by the TRCF.

15. The method according to claim 14, further comprising:
after receiving the confirmation message, the resources mediation PDF sending a resources releasing response message to the AF.

16. The method according to claim 1, further comprising:
when determining that the resources are not available, the BGF sending a resources unavailable indication message to the resources mediation PDF;
after receiving the resources unavailable message, the resources mediation PDF sending an admission deleting indication message to the TRCF and sending a resources releasing indication message to the AF;
after receiving the admission deleting indication message, the TRCF modifying resources allocation information stored by the TRCF; and
after receiving the resources releasing indication message, the AF releasing a corresponding session.

17. The method according to claim 1, further comprising:
when determining that the resources are not available, the TRCF sending a resources unavailable indication message to the resources mediation PDF;
after receiving the resources unavailable message, the resources mediation PDF sending a resources unavailable indication message to the AF, and sending an admission deleting or stopping command to the BGF;

after receiving the resource unavailable indication message, the AF releasing a corresponding session; and
after receiving the admission deleting or stopping command, the BGF deleting or stopping enforcing the corresponding admission decision parameters information.

* * * * *